April 13, 1965 E. J. SAXL 3,177,708
TENSION METER
Filed June 14, 1960 4 Sheets-Sheet 3
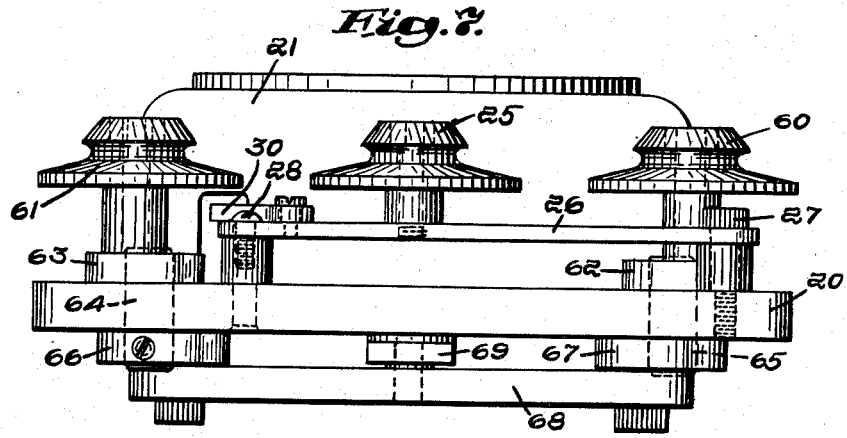
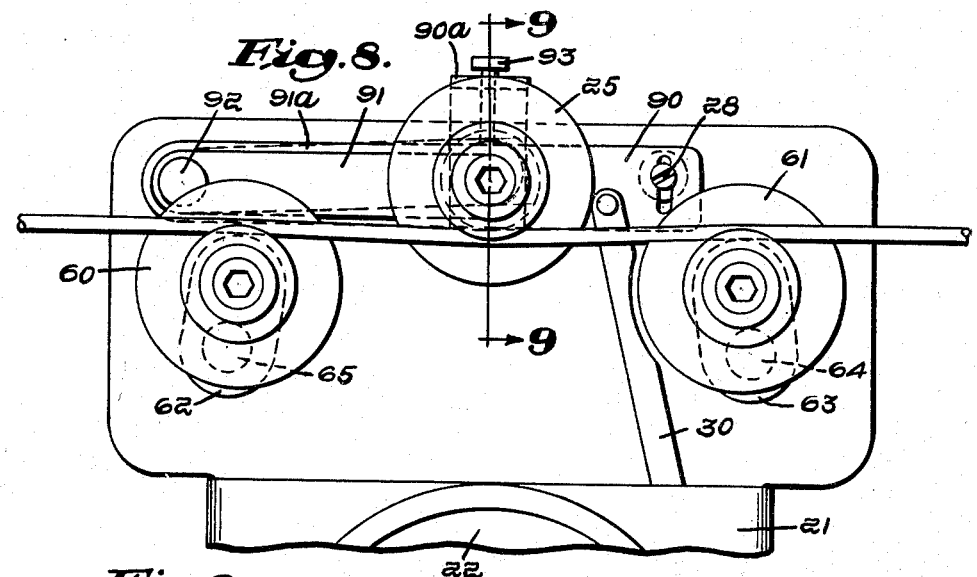
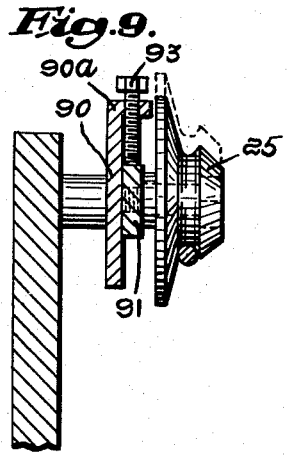
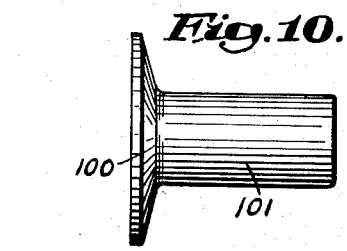
Inventor:
Erwin J. Saxl,
by Arthur D. Thomson
Attorney April 13, 1965     E. J. SAXL     3,177,708
TENSION METER
Filed June 14, 1960     4 Sheets-Sheet 4
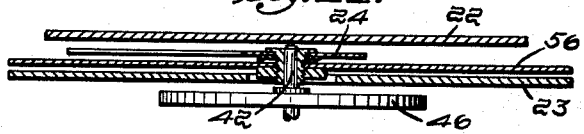
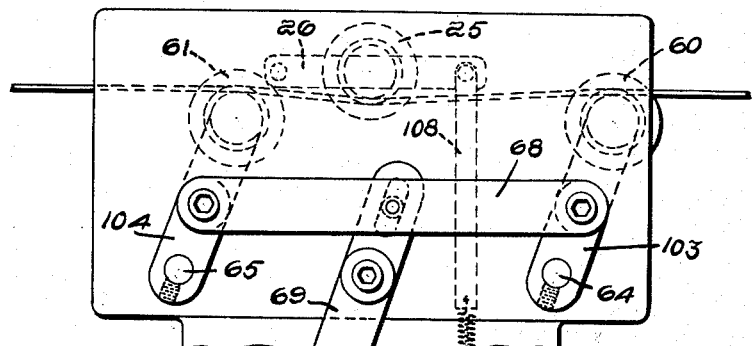
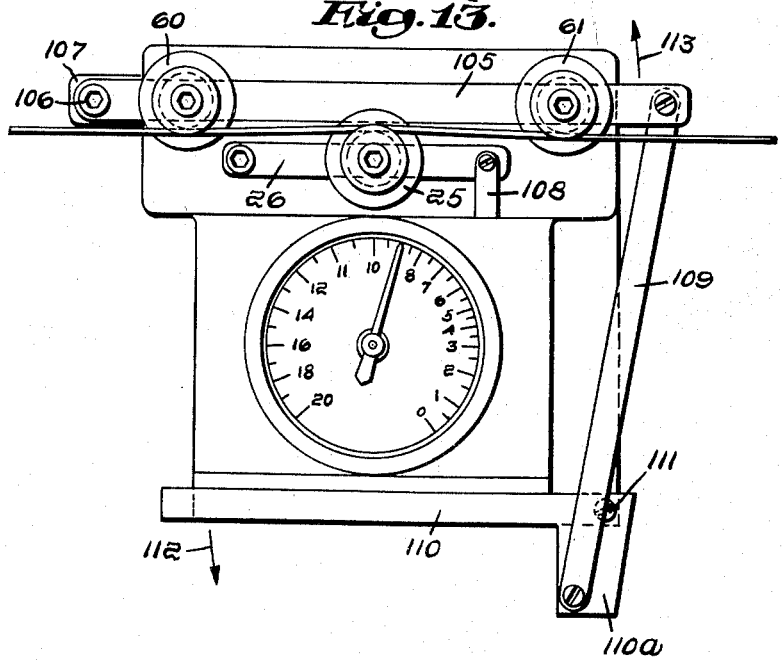
Inventor:
Erwin J. Saxl,
by Arthur D. Thomson
Attorney United States Patent Office 3,177,708
Patented Apr. 13, 1965

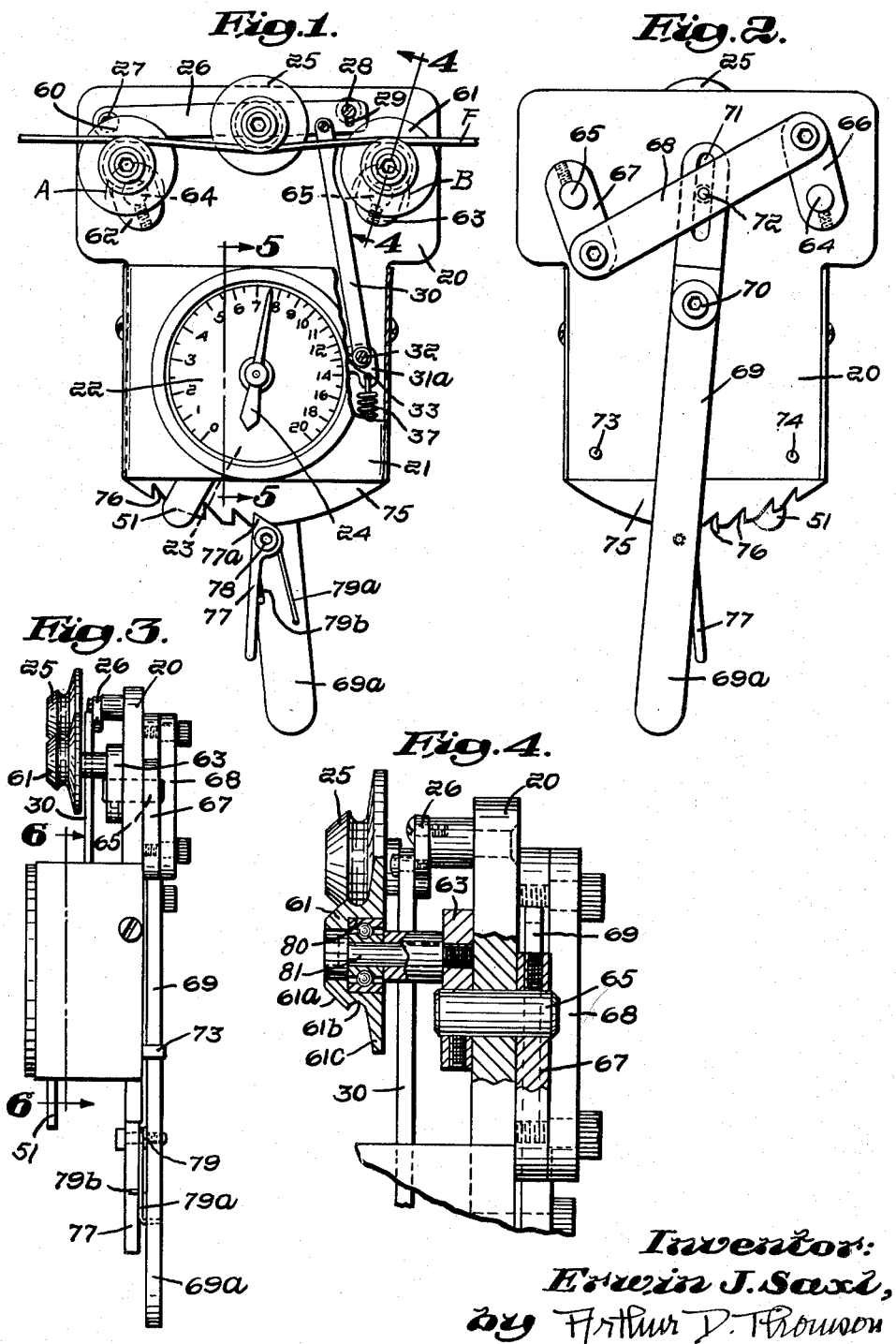

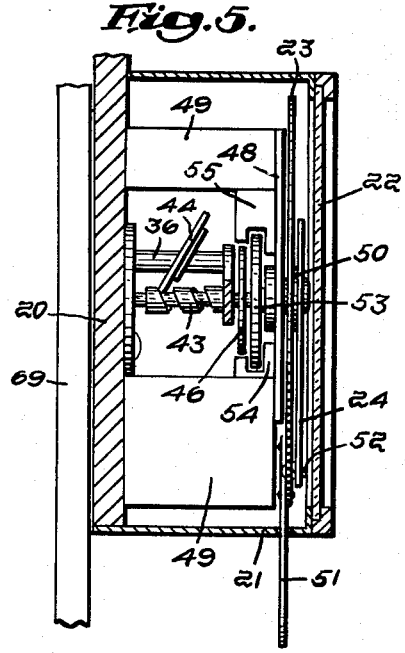
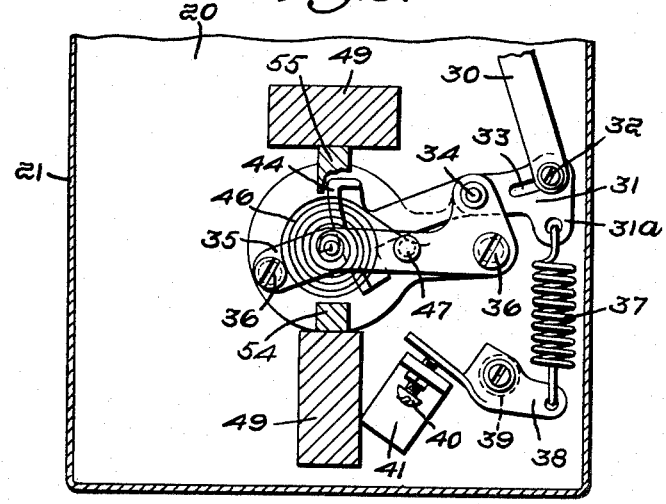

3,177,708
TENSION METER
Erwin J. Saxl, % Tensitron, Inc., Harvard, Mass.
Filed June 14, 1960, Ser. No. 36,064
6 Claims. (Cl. 73—144)

This invention relates to meters for measuring tension in filamentary materials, such as yarn or wire, and pertains more particularly to improvements in portable meters of the general type described in my previous Patent No. 2,591,724.

The tension meter described in the aforesaid patent employs three rollers which engage the yarn and are arranged in a row. The two end rollers are movable to permit insertion of the yarn between them and the center roller but are fixed, while the tension measuring operation is performed, in such a position that the filament is deflected from a straight path as it passes the center roller. Tension on the filament creates a force tending to move the center roller in such a direction as to straighten the filament path. The center roller is connected to a spring-tensioned linkage to a pointer which travels over a calibrated indicator dial. The movement of the center roller is proportionate to the tension in the filament, and this motion is transmitted to the pointer so that the tension can be read on the dial. My previously patented construction is chiefly intended for measuring tension in thin flexible filaments, tapes, or similar materials.

The principal object of this invention is to provide a tension meter, operating on the general principle just described, which is suitable not only for use on relatively thin flexible materials, but also for use on materials of substantial thickness and on relatively rigid or brittle materials which will withstand only a limited amount of bending. Another object is to provide a meter construction which can be used for relatively high tension measurement, which is safe for an operator to use on rapidly moving materials, which has means for compensating for the effect of stiffness or thickness of the material on the tension reading, and which will give a stable and accurate measurement on material moving at high speed as well as on stationary or slowly moving mataerials. Other objects and advantages of the invention will be apparent from the following description.

In the drawings illustrating the invention:

FIG. 1 is a top plan view of a tension meter constructed according to the invention;

FIG. 2 is a bottom view of the tension meter;

FIG. 3 is a side view of the tension meter with the cover shown partly broken away;

FIG. 4 is a fragmentary cross-section, somewhat enlarged, taken along line 4—4 of FIG. 1;

FIG. 5 is a fragmentary cross-section taken along line 5—5 of FIG. 1;

FIG. 6 is a fragmentary cross-section taken along line 6—6 of FIG. 3;

FIG. 7 is an enlarged end view of the tension meter;

FIG. 8 is an enlarged fragmentary top view of a modified form of the roller arrangement on the meter;

FIG. 9 is a fragmentary cross-section taken along line 9—9 of FIG. 8;

FIG. 10 is a side elevation of an alternative form of roller;

FIG. 11 is a fragmentary cross-section taken in the region of the dial showing an alternative damping arrangement for the pointer;

FIG. 12 is a fragmentary bottom view showing a modified form of linkage for moving the end rollers; and FIG. 13 is a top plan view of a meter equipped with another modification of the linkage for moving the end rollers.

The various parts of the tension meter are mounted on a base plate 20 to which is attached a removable cover 21 which houses the dial and pointer movement. The cover has a glass window 22 through which the indicator dial 23 and pointer 24 are visible. The center roller 25 is rotatably mounted on an arm 26 pivoted at one end on a stud 27 on the base plate. A stud 28, also mounted on the base plate, engages in a slot 29 in the arm to limit travel of the arm.

Arm 26 is connected by a link 30, which passes through a slot in the cover 21, to a rocker arm 31 disposed within the cover. A screw 32, which passes through one end of link 30, rides in a slot 33 in arm 31, and engages a clamping nut (not shown). By means of this connection the leverage of the link on the arm may be adjusted. Arm 31 is mounted on a shaft 34, which is journalled on the base plate and on a bracket 35 spaced from the plate on studs 36. Arm 31 has a tongue 31a to which is connected a coil spring 37. The other end of the spring is attached to one end of arm 38 rotatably mounted on a stud 39. A screw 40, threaded in a bracket 41 on the base plate, engages the other end of arm 38 to provide adjustment of the initial spring tension.

Journalled on the base plate and in bracket 35 is a shaft 42 which carries a spiral track 43. The pointer 24 is mounted on the upper end of this shaft. Arm 31 carries an obliquely disposed shoe 44, which engages in track 43. Motion of arm 31 causes relative motion between shoe 44 and the track, producing rotation of shaft 42. By means of the linkage just described, linear movement of roller 25 in the directions toward and away from the cover 21 is transmitted as rotational movement to the pointer. A watch spring 46, connected to shaft 42 and to a stud 47 on bracket 35, takes up any backlash in the motion.

The dial 23 is rotatably mounted on shaft 42 just below the pointer and bears on a friction plate 48 mounted on posts 49. A washer 50 keeps the pointer spaced from the dial. The dial ordinarily stays in a fixed position, but can be rotated, independently of the pointer, by means of a handle 51 projecting through a slot in the cover. The dial carries a stop 52 at the zero indication.

When taking readings, especially on materials under high tension or moving at high speed, oscillation of the pointer may occur when the rolls are first engaged with the material. To facilitate obtaining a stable reading quickly, in the form shown in FIG. 5, the pointer is damped by means of a flywheel 53, of magnetic material, mounted on shaft 42, and a pair of magnets 54 and 55 mounted alongside the flywheel. In an alternative arrangement, shown in FIG. 11, a flywheel 56, which may be of substantially the size of the dial, is secured to the shaft 42 between the pointer and the dial. Flywheel 56 is made of transparent plastic or glass so as not to interfere with reading of the dial.

The two end rollers 60 and 61 are mounted on arms 62 and 63, connected to shafts 64 and 65, respectively, which pass through and are journalled in the base plate 20. As seen in FIG. 2, another pair of arms 66 and 67 are connected to these shafts on the back of the base plate. These arms are connected together by a link 68. A lever 69 is rotatably mounted on a stud 70 on the base plate and has a slot 71 in which a pin 72, mounted on link 68, is engaged. Lever 69 has a handle portion 69a which projects beyond the base plate. By moving the handle from side to side, arms 66 and 67 and, consequently, the arms 62 and 63 carrying the rollers 60 and 61, are turned, swinging these rollers simultaneously through arcs toward or away from each other. A pair of stops 73 and 74 on the back of the base plate limit the travel of the handle.

A ratchet plate 75 having a number of notches 76 is mounted on one end of base plate 20, or may be an integral extension of the base plate. A latch 77 is rotatably mounted on a stud 78 on handle portion 69a of lever 69. A spring 79 coiled around stud 78 has a leg 79a anchored to lever 69 and another leg 79b which bears against latch 77 and urges the latch clockwise, as viewed in FIG. 1. The latch carries a pawl 77a which is adapted to engage in any of the notches 76. The force of spring 79 normally maintains the pawl in engagement in one of notches 76 and thus locks the lever 69 in any desired position. The pawl may be released, to allow the lever to be moved, by pressing latch 77 toward the handle portion (counter-clockwise, as viewed in FIG. 1).

The shape and mounting of roller 61 is best illustrated in FIG. 4. The roller has a bevelled front face 61a, a trough 61b in which the filament rides, and a wide flange 61c which serves as a guard to prevent the filament from overriding the rear of the roller and getting caught in the instrument. The roller is mounted on a ball bearing 80 on a stud 81 which is mounted on arm 63. The construction and mounting of the other two rollers is similar.

It has been noted that movement of lever 69 causes rollers 60 and 61 to be moved along arcuate paths. The dot and dash lines A and B indicate the paths of the centers of the rollers. When the handle 69a is moved to its extreme right-hand position, as viewed in FIG. 1, the two end rollers are moved to their furthest outward position from the center roller. In this position the upper parts of the trough portion of the end rollers are in line, or very nearly in line, with the lower part of the trough portion of the center roller. The filament F, on which the tension measurement is to be made can be readily inserted to lie between the center roller and the end rollers.

For measuring tension in the filament, the handle 69a is moved to the left of the center of the plate. It will be noted that the end rollers not only move toward each other, but also move upward, as viewed in FIG. 1, until the arms 62 and 63 are parallel to each other. Thereafter further movement of the handle to the left will bring the end rollers toward each other but their centers will travel downward. The end rollers thus pass by a dead center position and cannot accidentally be pushed back to their open position by tension of the filament, even though the latch 77 is disengaged, or the instrument is used without the latch and ratchet plate, which may be omitted for some uses.

When the instrument is in measuring position, tension on the filament F causes arm 26 to move to a position in which the spring force on the transmitting linkage balances the filament tension, causing the pointer 24 to indicate the tension reading on the dial.

When the instrument is used on relatively rigid materials, such as a stiff wire or cable, the bending resistance of the filament, even in the absence of tension, may produce initial movement of the pointer which would introduce error into the tension reading. To compensate for this effect, a sample of the filament may be held in the instrument without tension, and the dial moved by means of handle 51 to bring the zero indication in line with the pointer.

The movable dial also permits the zero indication to be brought into alignment with the pointer when there is no deflection of the pointer. This is much easier than making adjustments in the linkage, as would be necessary in assembling the instrument if the dial were fixed.

The latch and ratchet plate permits setting the instrument for measuring tension on materials of widely varying thicknesses and stiffness. For example, for rigid or brittle materials, such as lacquered wire, which might be damaged by excessive deflection while passing through the rollers, the handle 69a could be locked in the position corresponding to the extreme left-hand notch, so that the filament would be subject to minimum deflection. The same position would be suitable for thick materials, especially those which are relatively stiff, such as wire cable. For measurement on finer, more flexible materials, the handle 69a may be set to one of the intermediate notches, so that the overlap of the end roller troughs and the center roller trough is greater.

For use on very thick materials it may be desirable to set the rollers so that there is no overlap, or even a space, between the center roller trough and the end roller troughs, in order to avoid excessive deflection of the filament. The modification of the device shown in FIGS. 8 and 9 provides for adjustment of the relative positions of the rollers. In this form of the device the mounting of the end rollers 60 and 61 and their associated linkage are the same as in the form previously described. The linkage for operating the pointer is also the same. The center roller 25, however, is not mounted directly on arm 90, which corresponds to arm 26, but is mounted on a separate arm 91 pivoted on the same stud 92 as arm 90. Arm 90 carries an extension 90a into which a screw 93 is threaded. This screw serves as a stop to limit the upward travel of arm 91. By backing off screw 93, arm 91 may be permitted to swing further upward, as indicated by the dotted line 91a, thus allowing for greater initial spacing of roller 25 from rollers 60 and 61 to accommodate thick materials.

In FIG. 10 an alternative form of roller is shown. This roller has a back flange 100, and a straight cylindrical portion 101. A roller of this type may be substituted for each of the three rollers 25, 60, and 61 to adapt the instrument for use on sheet or wide tape.

In the form of linkage illustrated in FIG. 12, a pair of arms 103 and 104 are attached to shafts 64 and 65 in parallel relationship, with their ends attached to crossbar 68. With this arrangement, rollers 60 and 61 will swing in the same direction when lever 69 is moved. The rollers still travel past a dead center position so that they cannot accidentally return to the open, or inserting, position under tension of the filament.

In FIG. 13 rollers 60 and 61 are mounted on a single arm pivoted on a stud 106 on an extenseion 107 of the base plate. Roller 25, on arm 26 is mounted below rollers 60 and 61. A link 108, somewhat shorter than link 30, connects arm 26 to arm 31, and a compression spring (not shown) is used in place of tension spring 37. The center roller, in this arrangement, moves toward the indicating mechanism as the tension increases, and the indications on the dial face are accordingly reversed.

A link 109 is connected to the end of arm 105. An L-shaped lever 110 is pivoted on a pin 111 on the casing, and has a short leg 110a to which link 109 is connected. Movement of the left-hand end of lever 110 in the direction of arrow 112 causes arm 105 to swing in the direction of arrow 113, carrying rollers 60 and 61 away from roller 25 to permit insertion of the filament. Lever 110 is then swung back against the base plate to bring the rollers into measuring position. It will be noted that link 109 swings beyond the center line of pin 111. The linkage thus moves past a dead center point 111 and rollers 60 and 61 cannot be moved out of measuring position by the tension on the filament. In all the forms of the instrument just described, the rollers all have parallel axes and move only in a plane perpendicular to their axes. The rollers, therefore, remain in alignment with the plane of the filament even though the displacement of roller 25 becomes rather large, due to the size or stiffness of the filament. The outer rollers are locked in a definite position for measuring and thus give a definite reference position from which the displacement of roller 25 under tension of the filament is measured. Another advantage of this instrument is that the inserting linkage, which moves rollers 60 and 61 is operated from the opposite end of the base plate, so that the operator does not need to get his fingers close to the running filament.

It is understood that the size and shape of the rollers may be varied, according to the type of material on which the meter is to be used. For example, by widening and flattening their trough portions the rollers may be adapted to measure tension in flat tape. The terms "filament" and "filamentary material" where used herein is intended in a general sense to include materials such as single or multiple strand yarns, twisted or braided cords and ropes, wire, coated cord or wire, twisted or braided wire cable, composite yarns or cables, monofilm, woven or braided strips, both narrow enough to be regarded as tapes and wide enough to be regarded as sheets, and any other materials of a filament-like or strip-like form.

The meter can be used to measure tension on running as well as stationary filaments, as the ball bearing mounted rollers offer negligible resistance to movement of the filament. Filament tension measurements may be readily made by means of this meter during operations such as weaving or winding, or other processes involving the use or treatment of the filamentary material.

What is claimed is:

1. A tension meter comprising a base, a pair of spaced filament engaging members movably mounted on said base, a third filament engaging member movably mounted on said base between said pair, all of said members having spaced parallel axes and having a plane of motion perpendicular to said axes and being adapted to engage a filament with said pair of members and third member disposed on opposite sides of the filament, means connected to said third member for indicating its motion along its plane, means operatively connected to said third member for deflecting from a straight path a filament engaged by said members, a manually operable lever movably mounted on said base, and a linkage connecting said lever to said pair of spaced members and adapted to move said pair in unison along their plane of motion when said lever is moved, said linkage including a cross-bar interconnecting said pair of spaced members, said linkage having a dead center position and being movable in opposite directions past said position by moving said lever in opposite directions.

2. A tension meter comprising a base, a pair of spaced filament engaging members movably mounted on said base, a third filament engaging member movably mounted on said base between said pair, all of said members having spaced parallel axes and having a plane of motion perpendicular to said axes and being adapted to engage a filament with said pair of members and said third member disposed on opposite sides of the filament, means connected to said third member for indicating its motion along its plane, means operably connected to said third member for deflecting from a straight path a filament engaged by said members, a manually operable lever movably mounted on said base, a linkage connecting said lever to said pair of spaced members and adapted to move said pair in unison along their plane of motion when said lever is moved, said linkage including a cross-bar inter-connecting said pair, a movable detecting arm mounted on said base, an adjusting arm rotatably mounted on said detecting arm, said third member being mounted on said adjusting arm, and said detecting arm carrying an adjustable stop adapted to limit the travel of said adjusting arm.

3. A tension meter comprising a base, a pair of spaced parallel shafts rotatably mounted on said base, a first pair of arms one fixed to each said shafts, a second pair of arms one fixed to each of said shafts, a pair of filament engaging members one mounted on each of said second arms, a third filament engaging member movably mounted on said base, all said members having parallel axes and having a plane of motion perpendicular to said axes and being adapted to engage a filament with said pair of members and said third member disposed on opposite sides of the filament, means connected to said third member for indicating its motion along said plane, means operatively connected to said third member for deflecting from a straight path a filament engaged by said members, a cross-bar directly interconnecting said first pair of arms, and a manually movable lever pivoted on said base, and connecting means between said lever and said cross-bar adapted to transmit rotary movement of the lever as linear movement to said cross-bar and thereby swing said arms.

4. A tension meter as described in claim 3 the two arms fixed to one of said shafts extending in opposite directions therefrom, and the arms of said first pair extending parallel to one another and in opposite directions from their respective shafts.

5. A tension meter as described in claim 3, the arms of each of said pairs extending parallel to one another.

6. A tension meter comprising a base, a pair of spaced filament engaging members movably mounted on said base, a third filament engaging member movably mounted on said base between said pair, all of said members having spaced parallel axes and having a plane of motion perpendicular to said axes and being adapted to engage a filament with said pair of members and said third member disposed on opposite sides of the filament, means connected to said third member for indicating its motion along its plane, means operatively connected to said third member for deflecting from a straight path a filament engaged by said members, a manually operable lever movably mounted on said base, a linkage connecting said lever to said pair of speed members and adapted to move said pair in unison along their plane of motion when said lever is moved, a ratchet plate attached to said base and having a number of notches, and a latch member mounted on said lever and releasably engageable with any one of said notches, said notches being placed to and adapted to lock said linkage and thereby said pair of filament engaging members in a number of predetermined positions.

References Cited in the file of this patent

UNITED STATES PATENTS

| Re. 21,934 | Buechmann | Nov. 4, 1941 |
| 1,593,626 | Foote | July 27, 1926 |
| 2,294,869 | Buechmann | Sept. 1, 1942 |
| 2,471,999 | Boos | May 31, 1949 |
| 2,639,612 | Allen | May 26, 1953 |

FOREIGN PATENTS

| 928,178 | France | May 26, 1947 |
| 729,979 | Great Britain | May 11, 1955 |

OTHER REFERENCES

Publication: "The Helicoid Gage," published by Helicoid Gage Division, American Chain & Cable Co. Inc., Bridgeport 2, Conn., copyright 1946, 8 pages.